(12) United States Patent
Zhao et al.

(10) Patent No.: US 10,846,402 B2
(45) Date of Patent: Nov. 24, 2020

(54) SECURITY SCANNING METHOD AND APPARATUS FOR MINI PROGRAM, AND ELECTRONIC DEVICE

(71) Applicant: ADVANCED NEW TECHNOLOGIES CO., LTD., Grand Cayman (KY)

(72) Inventors: Hao Zhao, Hangzhou (CN); Shijie Cao, Hangzhou (CN); Shanhu Shang, Hangzhou (CN); Peng Liu, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/737,766

(22) Filed: Jan. 8, 2020

(65) Prior Publication Data

US 2020/0143051 A1 May 7, 2020

Related U.S. Application Data

(63) Continuation of application No. PCT/CN2018/099570, filed on Aug. 9, 2018.

(30) Foreign Application Priority Data

Oct. 9, 2017 (CN) .......................... 2017 1 0929306

(51) Int. Cl.
*G06F 21/56* (2013.01)
*G06F 21/55* (2013.01)
*G06F 21/54* (2013.01)

(52) U.S. Cl.
CPC ............ *G06F 21/564* (2013.01); *G06F 21/54* (2013.01); *G06F 21/556* (2013.01); *G06F 21/566* (2013.01)

(58) Field of Classification Search
CPC ...... G06F 21/564; G06F 21/54; G06F 21/556; G06F 21/566
See application file for complete search history.

(56) References Cited

U.S. PATENT DOCUMENTS

| 5,276,816 A | 1/1994 | Cavendish et al. |
| 5,287,447 A * | 2/1994 | Miller .................... G06F 9/4488 715/804 |

(Continued)

FOREIGN PATENT DOCUMENTS

| CN | 102789502 A | 11/2012 |
| CN | 103377341 A | 10/2013 |

(Continued)

OTHER PUBLICATIONS

Written Opinion of the International Searching Authority and International Search Report for PCT Application No. PCT/CN2018/099570 dated Sep. 13, 2018 with partial English translation (9 pages).

(Continued)

*Primary Examiner* — Yonas A Bayou (57) ABSTRACT

Methods, systems, and devices, including computer programs encoded on computer storage media, for security scanning a mini program are provided. One of the methods includes: obtaining a target mini program to be released, invoking a security scanning strategy combination to perform multi-dimensional security scanning on the target mini program; and when the target mini program passes the multi-dimensional security scanning, releasing the target mini program to a server. The multi-dimensional security scanning may include malicious code scanning on the target mini program, security loophole scanning on the target mini program, and security loophole scanning on a server interface of the target mini program.

20 Claims, 3 Drawing Sheets

(56) References Cited

U.S. PATENT DOCUMENTS

| | | | | |
|---|---|---|---|---|
| 5,754,174 | A * | 5/1998 | Carpenter | G06F 3/0481 |
| | | | | 715/810 |
| 6,065,043 | A * | 5/2000 | Domenikos | G06F 9/445 |
| | | | | 709/203 |
| 6,698,018 | B1 * | 2/2004 | Zimniewicz | G06F 8/61 |
| | | | | 717/169 |
| 8,132,176 | B2 * | 3/2012 | Bissett | G06F 9/468 |
| | | | | 718/104 |
| 8,918,882 | B2 * | 12/2014 | Bettini | G06F 21/53 |
| | | | | 726/24 |
| 9,596,257 | B2 * | 3/2017 | Das | H04W 12/12 |
| 9,846,776 | B1 * | 12/2017 | Paithane | G06F 16/128 |
| 10,192,053 | B2 * | 1/2019 | Zou | G06F 21/564 |
| 10,203,868 | B2 * | 2/2019 | Bauer | G06F 3/0233 |
| 2002/0085037 | A1 * | 7/2002 | Leavitt | G06F 3/0482 |
| | | | | 715/765 |
| 2006/0005207 | A1 * | 1/2006 | Louch | G06F 8/38 |
| | | | | 719/328 |
| 2009/0271867 | A1 * | 10/2009 | Zhang | G06F 21/566 |
| | | | | 726/24 |
| 2015/0033342 | A1 | 1/2015 | Zhang et al. | |
| 2016/0142437 | A1 | 5/2016 | Beskrovny et al. | |

FOREIGN PATENT DOCUMENTS

| | | | |
|---|---|---|---|
| CN | 103403669 | A | 11/2013 |
| CN | 103473381 | A | 12/2013 |
| CN | 103984697 | A * | 8/2014 |
| CN | 103984697 | A | 8/2014 |
| CN | 104462971 | A | 3/2015 |
| CN | 106503548 | A | 3/2017 |
| CN | 106548074 | A | 3/2017 |
| CN | 106682561 | A | 5/2017 |
| CN | 106850209 | A | 6/2017 |
| CN | 107045609 | A | 8/2017 |
| CN | 107885995 | | 4/2018 |
| WO | 2017/126786 | A1 | 7/2017 |

OTHER PUBLICATIONS

Notification of Transmittal of International Preliminary Report on Patentability Chapter I for PCT Application No. PCT/CN2018/099570 dated Apr. 23, 2020.
Search Report for Taiwanese Application No. 107127801 dated May 28, 2019.
Search Report for European Application No. 18865893.4 dated Mar. 30, 2020.
First Search Report for Chinese Application No. 201710929306.9 dated Jan. 17, 2020.
Supplementary Search Report for Chinese Application No. 201710929306.9 dated Mar. 17, 2020.

* cited by examiner

SECURITY SCANNING METHOD AND APPARATUS FOR MINI PROGRAM, AND ELECTRONIC DEVICE

CROSS-REFERENCE TO RELATED APPLICATIONS

The present application is a continuation application of International Application No. PCT/CN2018/099570, filed on Aug. 9, 2018, which claims priority and the benefit of the Chinese Patent Application No. 201710929306.9 filed with China National Intellectual Property Administration (CNIPA) of the People's Republic of China on Oct. 9, 2017. The entire contents of the above-identified applications are incorporated by reference herein.

TECHNICAL FIELD

The present specification relates to the field of computer applications, and in particular, to a security scanning method, apparatus and electronic device for a mini program.

BACKGROUND

Mini programs refer to mobile terminal APPs that are developed based on a programming language and can be used without download or installation. Mini programs are convenient to use, as the mini programs do not need to be manually installed in an operating system of a mobile terminal. However, mini programs often need to use a large APP as a carrier in use. For example, servers of some large APPs may interface with a third party's mini program development platform. After the development of a mini program is completed through a mini program development platform, a developer may release the completed mini program to the server of a large APP for interfacing with the large APP.

SUMMARY

The present specification provides a security scanning method for a mini program. the method may include: obtaining a target mini program to be released; invoking a security scanning strategy combination to perform multi-dimensional security scanning on the target mini program; and when the target mini program passes the multi-dimensional security scanning, releasing the target mini program to a server. The multi-dimensional security scanning may include malicious code scanning on the target mini program, security loophole scanning on the target mini program, and security loophole scanning on a server interface of the target mini program.

In some embodiments, the performing malicious code scanning on the target mini program comprises a combination of one or more of: detecting whether the target mini program includes a payload; detecting whether a malicious invoking function is present in functions invoked by the target mini program; and detecting whether media or text content invoked by the target mini program has non-compliant content. The malicious invoking function is an unauthorized invoking function for the target mini program.

In some embodiments, the performing security loophole scanning on the target mini program comprises one or more of: detecting whether the target mini program includes a sensitive information leaking loophole; detecting whether the target mini program includes an HTML code loophole; detecting whether the target mini program includes a JS code loophole; and detecting whether the target mini program includes an unauthorized external resource reference loophole.

In some embodiments, the performing security loophole scanning on a server interface of the target mini program comprises: parsing the server interface of the target mini program; and performing interface loophole scanning on the parsed server interface.

The present specification further provides a security scanning apparatus for a mini program. The apparatus may include: an obtaining module configured to obtain a target mini program to be released; a scanning module configured to invoke a security scanning strategy combination to perform multi-dimensional security scanning on the target mini program; and a releasing module configured to, when the target mini program passes the multi-dimensional security scanning, release the target mini program to a server.

In some embodiments, the scanning module is configured to perform one or more of: malicious code scanning on the target mini program; security loophole scanning on the target mini program; and security loophole scanning on a server interface of the target mini program.

In some embodiments, the scanning module is configured to perform one or more of the malicious code scanning: detecting whether the target mini program includes a payload; detecting whether a malicious invoking function is present in functions invoked by the target mini program; and detecting whether media or text content invoked by the target mini program has non-compliant content. The malicious invoking function is an unauthorized invoking function for the target mini program.

In some embodiments, the scanning module is configured to perform one or more of the security loophole scanning: detecting whether the target mini program includes a sensitive information leaking loophole; detecting whether the target mini program includes an HTML code loophole; detecting whether the target mini program includes a JS code loophole; and detecting whether the target mini program includes an unauthorized external resource reference loophole.

In some embodiments, the scanning module is further configured to: parse the server interface of the target mini program; and perform interface loophole scanning on the parsed server interface.

In another aspect, the present specification also provides a non-transitory computer-readable storage medium for security scanning for a mini program. The non-transitory computer readable storage medium may store instructions executable by one or more processors to cause the one or more processors to perform operations. The operations may include: obtaining a target mini program to be released; invoking a security scanning strategy combination to perform multi-dimensional security scanning on the target mini program; and when the target mini program passes the multi-dimensional security scanning, releasing the target mini program to a server. The multi-dimensional security scanning may include malicious code scanning on the target mini program, security loophole scanning on the target mini program, and security loophole scanning on a server interface of the target mini program.

In yet another aspect, the present specification further provides a security scanning device for a mini program. The device may include one or more processors and a non-transitory computer-readable memory coupled to the one or more processors and configured with instructions executable by the one or more processors to perform operations. The operations may include: obtaining a target mini program to be released; invoking a security scanning strategy combination to perform multi-dimensional security scanning on the target mini program; and when the target mini program passes the multi-dimensional security scanning, releasing the target mini program to a server. The multi-dimensional security scanning may include malicious code scanning on the target mini program, security loophole scanning on the target mini program, and security loophole scanning on a server interface of the target mini program.

In the present specification, multi-dimensional security scanning is performed on a target mini program to be released by invoking a security scanning strategy combination, and when the target mini program passes the multi-dimensional security scanning, the target mini program is then released to a server for the target mini program to run within a target APP on the server, thereby effectively avoiding the release of malicious mini programs to the Internet that will impact the use security of users.

DETAILED DESCRIPTION

The present specification provides a technical solution of performing multi-dimensional security scanning on a target mini program to be released to avoid the release of malicious mini programs to the Internet.

A target mini program may run within a target APP. A server corresponding to the target APP may interface with an independent mini program development platform. A developer may use the development platform to develop a mini program based on his/her own service needs, communicate with the server, and package and upload the developed mini program to the server for review.

The server may include a scanning platform for performing security scanning on the mini program. A security scanning strategy combination may be installed in the scanning platform in advance. When the scanning platform receives a mini program uploaded and submitted by the developer via the development platform, the scanning platform may invoke the security scanning strategy combination to perform multi-dimensional security scanning on the mini program.

In some embodiments, the security scanning strategy combination may comprise scanning strategies such as malicious code scanning on mini programs, security loophole scanning on mini programs, and security loophole scanning on a server interface of mini programs. The scanning platform may invoke the security scanning strategy combination to perform security scanning on a mini program in dimensions such as malicious code scanning, security loophole scanning, and server interface loophole scanning. In some embodiments, the dimensions of security scanning may refer to the types of security scanning.

If the mini program passes the multi-dimensional security scanning, the mini program may be released to the server for the target mini program to run within the target APP on the server. Conversely, if the mini program does not pass the multi-dimensional security scanning, the mini program may be a malicious mini program, and the release flow of the mini program may be terminated.

Therefore, the scanning platform performs multi-dimensional security scanning on a target mini program to be released by invoking a security scanning strategy combination. When the target mini program passes the multi-dimensional security scanning, the scanning platform releases the target mini program to a server for the target mini program to run within a target APP on the server, thereby effectively avoiding the release of malicious mini programs to the Internet that will impact the use security of users.

The present specification will be described below with reference to exemplary embodiments and exemplary application scenarios.

Figure 1:
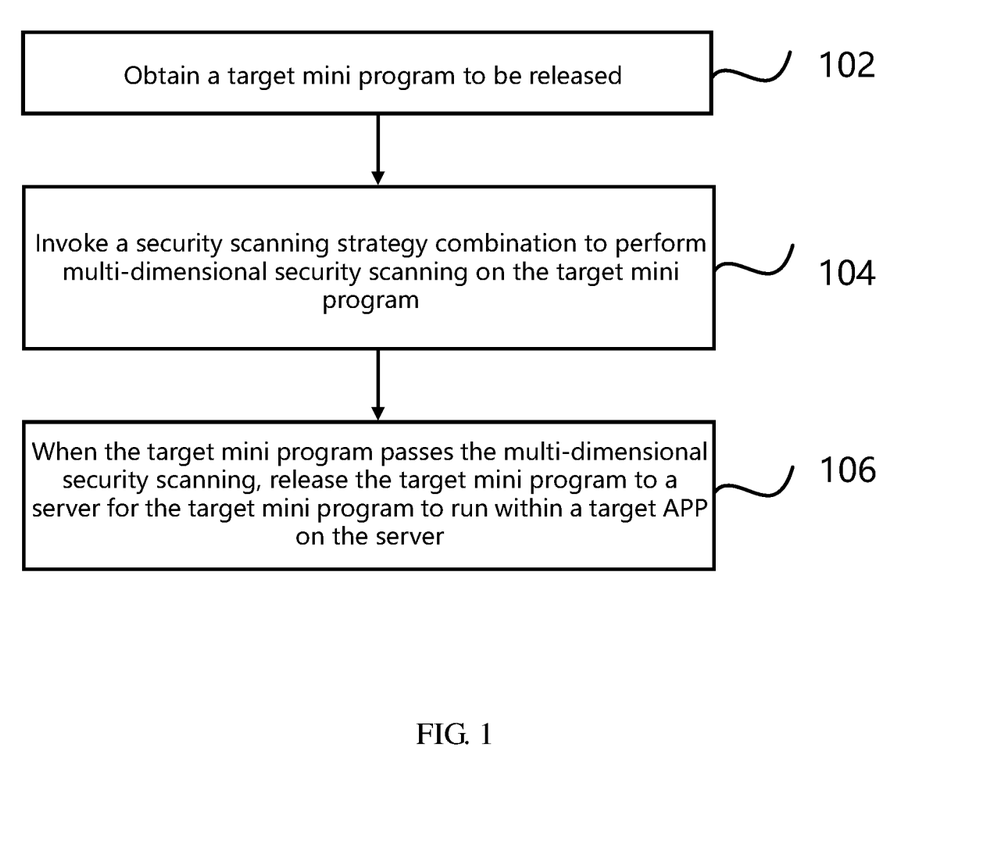
FIG. 1 is a flow chart of a security scanning method for a mini program as illustrated in some embodiments of the present specification.

FIG. 1 illustrates a security scanning method for a mini program according to some embodiments of the present specification. The method can be applied to a scanning platform to execute the following steps:

In Step 102, a target mini program to be released is obtained.

The scanning platform may, for example, comprise a service platform for performing security scanning on a target mini program to be released. In an exemplary embodiment, the scanning platform may, for example, be deployed on a server corresponding to a target APP, and the target mini program may run within the target APP. In some embodiments, when the hardware environment in which the server is installed may be a distributed server cluster, one or more physical servers may be selected from the server cluster as a hardware environment for installing the scanning platform, and the scanning platform may be constructed.

Alternatively, in another embodiment, the scanning platform may be deployed to be independent of the server. For example, the scanning platform may be independently deployed on one or more physical servers other than the server corresponding to the APP, and interface with the server corresponding to the APP. The mini program can run within the APP. The APP may, for example, comprise a native APP or a Web APP developed based on a web technology, which is not particularly defined in the present specification.

In the present specification, the server corresponding to the APP may further interface with an independent mini program development platform. The mini program development platform may, for example, be a mini program development platform that is operated independently by the operator of the APP or a third-party mini program development platform that is in cooperation with the operator of the APP, which is not particularly defined in the present specification.

A developer may develop a mini program based on his/her own service needs through the mini program development platform. After the mini program is developed, the developer can package and upload the developed mini program to the scanning platform for security scanning. Packaging the developed mini program may refer to, for example, a process of packaging executable codes of the developed mini program to an executable program.

In some embodiments, the mini program development platform may maintain data connection with the scanning platform and provide the developer with an upload port corresponding to the developed mini program. When the mini program is developed, the developer may trigger the upload port to upload and submit the packaged mini program to the scanning platform via the data connection.

For example, the data connection may be an http connection, and the upload port may be a function button for triggering the upload of a developed mini program provided by a development platform via a visual interface.

After the developer completes the development of executable codes of the mini program, the developer may compile and package the executable codes, trigger the function button, and upload the packaged mini program to the scanning platform. When the development platform detects an event of triggering the function button at the backend, it may construct an http request packet (e.g., an http post request) for including the packaged mini program, then use the packaged mini program as a load carried by the http request packet, and upload the http request packet to the scanning platform via the http connection. Upon receiving the http request packet, the scanning platform may parse the http request packet and obtain the packaged mini program carried in the http request packet.

In Step 104, a security scanning strategy combination is invoked to perform multi-dimensional security scanning on the target mini program.

In the present specification, a security scanning strategy combination may be installed on the scanning platform. The security scanning strategy combination may comprise predefined multi-dimensional security scanning strategies. Here, for every dimension of security scanning strategy in the security scanning strategy combination, a corresponding invoking interface may be developed. Upon receiving the target mini program to be released uploaded by the development platform, the scanning platform may start a security scanning flow to sequentially invoke the invoking interface of each security scanning strategy, execute each security scanning strategy, and perform multi-dimensional security scanning on the target mini program.

The invoking order of security scanning strategies in the security scanning strategy combination is not particularly defined in the present specification. A person skilled in the art may set priority for each security scanning strategy based on actual service needs, and set an invoking order for the security scanning strategies based on the priorities.

In one embodiment, the security scanning strategies in the security scanning strategy combination may, for example, comprise a combination of one or more of the following security scanning strategies: malicious code scanning on the target mini program; security loophole scanning on the target mini program; and security loophole scanning on a server interface of the target mini program.

The scanning platform may perform, by invoking the security scanning strategy combination, security scanning on the mini program in dimensions such as malicious code scanning, security loophole scanning, and server interface loophole scanning.

Detailed description for the scanning platform performing security scanning on the target mini program in three dimensions of malicious code scanning, security loophole scanning, and server interface loophole scanning will be provided below.

Figure 2:
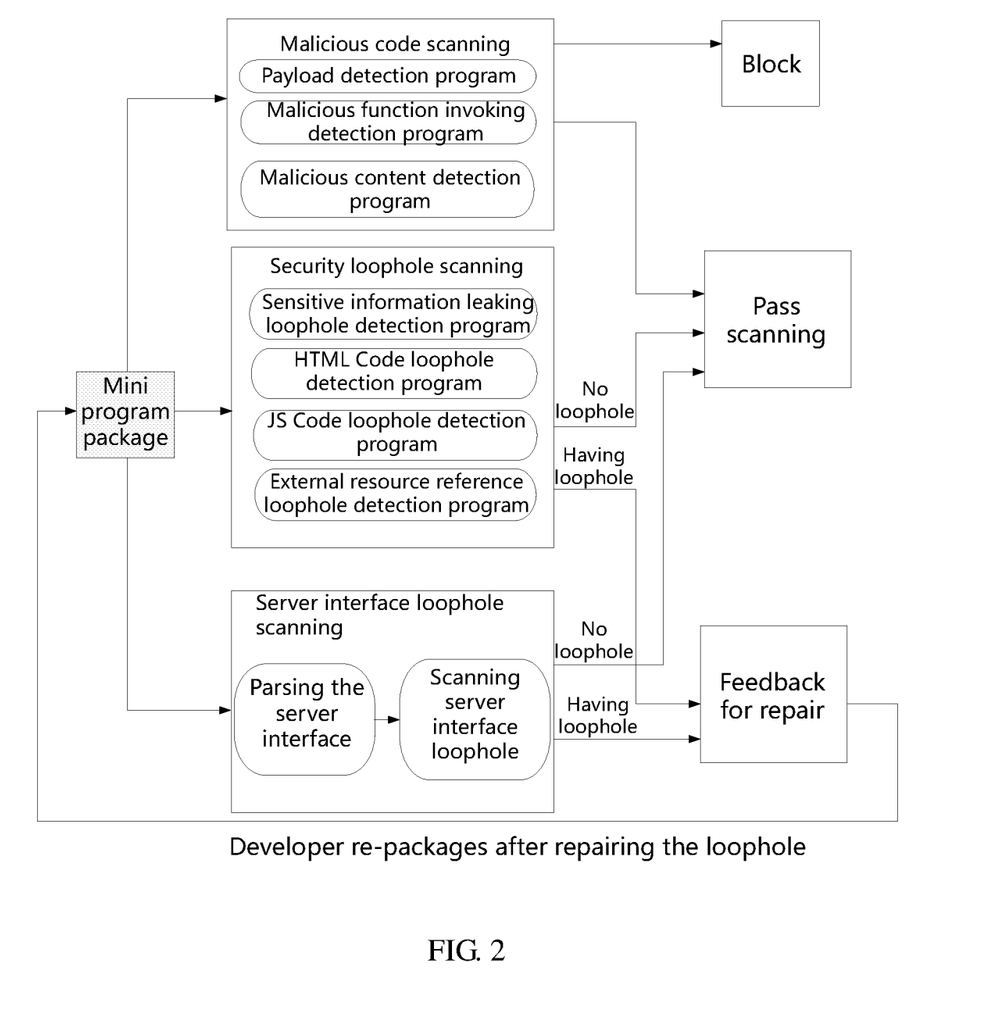
FIG. 2 is a flow chart of performing multi-dimensional security scanning on a mini program by a scanning platform as illustrated in some embodiments of the present specification.

FIG. 2 is a flow chart of performing multi-dimensional security scanning on the mini program by a scanning platform as illustrated in the present specification.

As shown in FIG. 2, in some embodiments, the security scanning performed by the scanning platform on the mini program may comprise three scanning dimensions of malicious code scanning, security loophole scanning, and server interface loophole scanning.

In some embodiments, the malicious code scanning on the target mini program may comprise one or more scanning programs including: a payload detection program; a malicious function invoking detection program; and a malicious content detection program.

The payload detection program is configured to, for example, detect whether the load of the target mini program includes a payload. In some embodiments, a plenty of samples of known payloads may be prepared in advance, such as samples of attack codes, samples of attack data, etc. When the payload detection needs to be performed on the target mini program, all codes and data in the load of the target mini program may be parsed, and the parsed codes and data are compared with the prepared samples of known payloads and analyzed to determine whether the load of the target mini program includes a payload. If the load of the target mini program includes a payload, the target mini program may be determined to be a malicious mini program. If the load of the target mini program does not include a payload, the target mini program may be determined to be a non-malicious mini program, and the scanning of the target mini program is passed.

The malicious function invoking detection program is configured to, for example, detect whether a malicious invoking function other than authorized invoking functions defined for the target mini program exists in all the functions invoked by the target mini program. For example, a number of invokable authorized functions or an authorized invoking range of invokable functions may be defined in advance for each developed mini program, which may be, for example, defined by a developer in the code of the mini program or defined separately by an operator of a target APP, and the target mini program can run within the APP. within which the target mini program can function.

When the malicious function invoking detection needs to be performed on the target mini program, all functions invoked by the target mini program may be parsed, and whether an unauthorized invoking function, i.e., a function other than the invokable authorized functions or a function beyond the authorized invoking range of invokable functions, exists in all the functions invoked by the target mini program may be determined. If a function other than the invokable authorized functions or a function beyond the authorized invoking range of invokable functions exists in all the functions invoked by the target mini program, a malicious function exists in all the functions invoked by the target mini program, in which case the target mini program may be determined to be a malicious mini program. Conversely, if a function other than the invokable authorized functions or a function beyond the authorized invoking range of invokable functions does not exist in all the functions invoked by the target mini program, no malicious function exists in all the functions invoked by the target mini program, in which case the target mini program may be determined to be a non-malicious mini program, and the scanning of the target mini program is passed.

The malicious content detection program is configured to, for example, detect whether media or text content invoked by the target mini program has non-compliant content. For example, a plenty of non-compliant content samples may be defined in advance, such as non-compliant text keywords, media fragments, and the like. When the malicious content detection needs to be performed on the target mini program, all media and text content invoked by the target mini program may be parsed, and the parsed media and text content are compared with the non-compliant content samples and analyzed to determine whether the media and text content invoked by the target mini program include non-compliant content. If it is determined that the media and text content invoked by the target mini program include non-compliant content, the target mini program may be determined to be a malicious mini program. Conversely, the target mini program may be determined to be a non-malicious mini program, and the scanning of the target mini program is passed.

As shown in FIG. 2, in some embodiments, the security loophole scanning on the target mini program may comprise one or more scanning programs including: a sensitive information leaking loophole detection program; an HTML code loophole detection program; a JS code loophole detection program; and an external resource reference loophole detection program.

The sensitive information leaking loophole detection program is configured to, for example, detect whether the target mini program has a sensitive information leaking loophole. The HTML code loophole detection program is configured to, for example, detect whether the target mini program has an HTML code loophole. The JS code loophole detection program is configured to, for example, detect whether the target mini program has a JS code loophole. The external resource reference loophole detection program is configured to, for example, detect whether the target mini program has a security loophole that refers to an unauthorized external resource, for example, an unauthorized link. The external resource reference loophole may also refer to a loophole of unauthorized external resources other than the authorized external resources defined for the target mini program.

In some embodiments, when invoking each of the loophole scanning programs listed above to perform relevant loophole scanning on the target mini program, the scanning platform may invoke a loophole scanning tool related to each of the loophole scanning programs and installed on the scanning platform to complete the loophole scanning.

For example, the scanning platform may be installed respectively with different types of loophole scanners corresponding to a sensitive information leaking loophole, an HTML code loophole, a JS code loophole, and an external resource reference loophole, and equipped with corresponding loophole databases. Then, by running the above loophole scanners, respectively, the scanning platform scans the target mini program, and performs comparison with the loophole databases for analysis to identify and discover potential security loopholes in the target mini program.

When the scanning platform detects relevant security loopholes in the target mini program by executing the loophole scanning programs, the loophole scanning results may be further fed back to the developer of the target mini program to repair the relevant security loopholes. After the security loopholes are repaired, the developer may re-package and upload the target mini program via the mini program development platform for the scanning platform to perform security scanning again. When the scanning platform detects that no relevant security loopholes exist in the target mini program by executing the loophole scanning programs, the scanning of the target mini program is passed.

In addition to performing malicious code scanning and security loophole scanning on the target mini program, the scanning platform may further perform security loophole scanning on a server interface of the target mini program.

In some embodiments, the scanning platform may parse all interfaces related to the functions in the mini target program, screen the parsed interfaces to obtain server interfaces of the target mini program, and then perform security loophole scanning on these server interfaces.

For example, the scanning platform may be installed with loophole scanners corresponding to server interface loopholes and equipped with corresponding loophole databases. Then, by running the above loophole scanners, respectively, the scanning platform scans each server interface of the target mini program, and performs comparison with the loophole databases for analysis to identify and discover potential security loopholes in these server interfaces.

When the scanning platform detects an interface loophole in a server interface of the target mini program, the loophole scanning result may be further fed back to the developer of the target mini program to repair the interface loophole. After the security loophole is repaired, the developer may re-package and upload the target mini program via the mini program development platform for the scanning platform to perform security scanning again. When no server interface loophole exists according to the scanning, the scanning of the target mini program is passed.

It is merely an example to take the scanning platform performing security scanning on the target mini program to be released in three dimensions of malicious code scanning, security loophole scanning, and server interface loophole scanning. In some embodiments, the security scanning strategies included in the security scanning strategy combination and the dimensions of security scanning performed by the scanning platform on the target mini program may be expanded according to actual needs, which will not be enumerated in the present specification.

In Step 106, when the target mini program passes the multi-dimensional security scanning, the target mini program is released to a for the target mini program to run within a target APP on the server.

In the present specification, after the scanning platform performs multi-dimensional security scanning on the mini program by invoking the security scanning strategy combination, and if the target mini program passes the multi-dimensional security scanning, the target mini program may be determined to be a non-malicious mini program, in which case the scanning platform may start a release flow for the target mini program to further release the target mini program to the server for the target mini program to run within the target APP on the server and to the Internet.

If the target mini program does not pass the multi-dimensional security scanning, the target mini program may be a malicious mini program, in which case the scanning platform may block the release flow of the target mini program and terminate the release flow of the target mini program, thereby avoiding the release of malicious mini programs to the Internet that will impact the use security of users.

For example, in FIG. 2, if the target mini program passes the security scanning in dimensions such as malicious code scanning, security loophole scanning, and server interface loophole scanning, respectively, the target mini program may be determined to be a non-malicious mini program and the target mini program may be normally released. Conversely, if the target mini program does not pass the security scanning in any one dimension of malicious code scanning, security loophole scanning, and server interface loophole scanning, the target mini program may be determined as a potential malicious mini program, and the scanning result may be actively fed back to the developer. After the target mini program is repaired by the developer, the multi-dimensional security scanning may be performed on the target mini program again. Alternatively, it may block the release flow of the mini program and terminate the release flow of the mini program.

The scanning platform performs multi-dimensional security scanning on a target mini program to be released by invoking a security scanning strategy combination, and when the target mini program passes the multi-dimensional security scanning, further releases the target mini program to a server for the target mini program to run within a target APP on the server, thereby effectively avoiding the release of malicious mini programs to the Internet that will impact the use security of users.

Corresponding to the above method embodiments, the present specification further provides a security scanning apparatus for a mini program.

Figure 3:
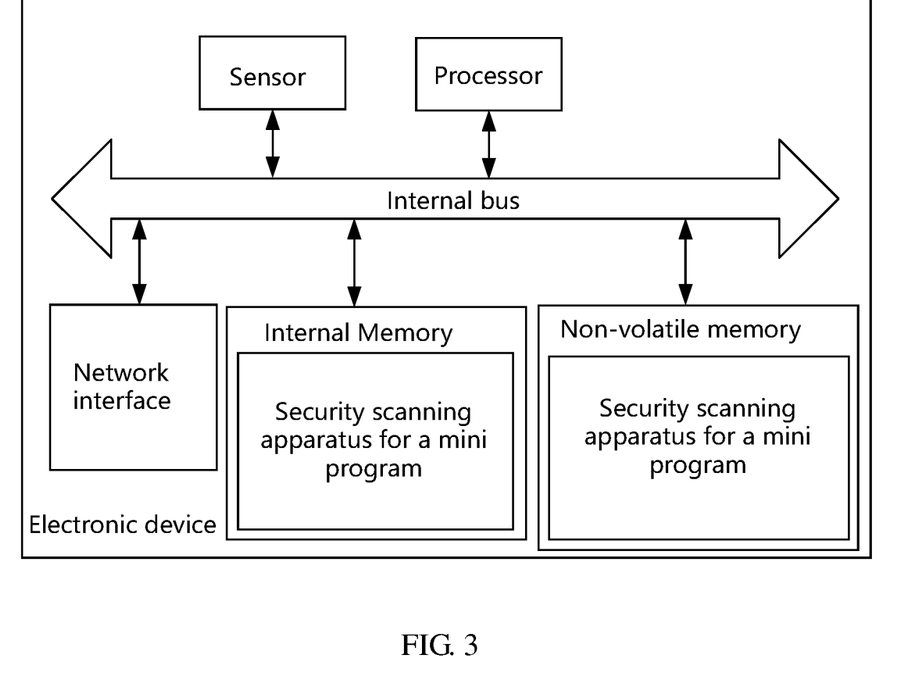
FIG. 3 is a schematic structural diagram of hardware in a security scanning electronic device for security scanning a mini program as illustrated in some embodiments of the present specification.

The security scanning apparatus for a mini program according to the present specification may be applied to an electronic device. The apparatus may be implemented by software, hardware, or a combination of software and hardware. Taking the software implementation as an example, an apparatus may execute a corresponding computer program instruction in a non-volatile memory, by a processor of the electronic device where the apparatus is located, into an internal memory. From the hardware perspective, FIG. 3 is a schematic structural diagram of the hardware of the electronic device where the security scanning apparatus for a mini program according to the present specification is located. In addition to the processor, sensor, internal memory, network interface, and non-volatile memory shown in FIG. 3, the electronic device where the apparatus is located may further comprise other pieces of hardware according to actual functions of the electronic device, which will not be elaborated herein.

Figure 4:
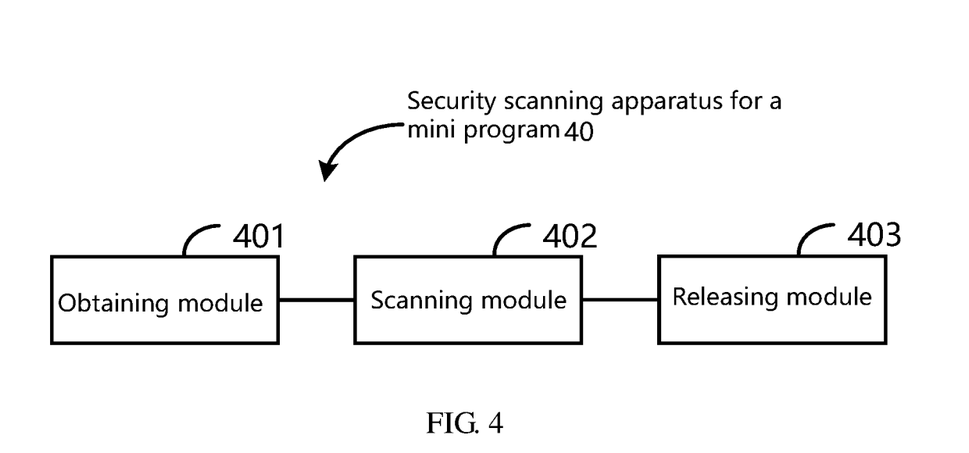
FIG. 4 is a logic block diagram of the security scanning apparatus for a mini program according to some embodiments of the present specification.

FIG. 4 is a block diagram of the security scanning apparatus for a mini program according to some embodiments of the present specification.

The security scanning apparatus 40 for a mini program may be applied to the electronic device shown in FIG. 3, the apparatus comprising: an obtaining module 401, a scanning module 402, and a releasing module 403. The obtaining module 401 is configured to obtain a target mini program to be released. The scanning module 402 is configured to invoke a security scanning strategy combination to perform multi-dimensional security scanning on the target mini program. The releasing module 403 is configured to, when the target mini program passes the multi-dimensional security scanning, release the target mini program to a server for the target mini program to run within a target APP on the server.

In some embodiments, the scanning module 402 is further configured to execute one or more of: malicious code scanning on the target mini program; security loophole scanning on the target mini program; and security loophole scanning on a server interface of the target mini program.

In some embodiments, the scanning module 402 is further configured to execute one or more malicious code scanning operations including: detecting whether the target mini program includes a payload; detecting whether a malicious invoking function other than authorized invoking functions defined for the target mini program exists in all the functions invoked by the target mini program; and detecting whether media or text content invoked by the target mini program has non-compliant content.

In some embodiments, the scanning module 402 is further configured to execute one or more security loophole scanning operations including: detecting whether the target mini program has a sensitive information leaking loophole; detecting whether the target mini program has an HTML code loophole; detecting whether the target mini program has a JS code loophole; and detecting whether the target mini program has an unauthorized external resource reference loophole.

In some embodiments, the scanning module 402 is further configured to: parse the server interface of the target mini program; and perform interface loophole scanning on the parsed server interface.

Since the apparatus embodiment substantially corresponds to the method embodiment, the description of the method embodiment may be referenced. The above-described apparatus embodiment is merely exemplary, wherein the units described as discrete parts may or may not be physically separated. The parts shown as units may or may not be physical units, i.e., the parts may be located at the same place or may be distributed over a plurality of network units. Some or all of the modules thereof may be selected according to actual needs to achieve the objective of the solutions of the present specification. Those of ordinary skills in the art may understand and implement the apparatus embodiment without inventive effort.

The system, apparatus, module or unit described in the above embodiments may be, for example, implemented by a computer chip or entity, or implemented by a product having the functions. In one example, an implementation device may refer to a computer, and the computer may be, for example, a server, a personal computer, a laptop computer, a cellular phone, a camera phone, a smart phone, a personal digital assistant, a medium player, a navigation device, an email receiving and transmitting device, a game console, a tablet computer, a wearable device, or a combination of any devices in these devices.

Corresponding to the above method embodiments, the present specification further provides an electronic device comprising: a processor and a memory configured to store processor executable instructions, wherein the processor and the memory may be connected to each other via an internal bus. In some embodiments, the device may further comprise an external interface for communications with other devices or parts. In some embodiments, the executable instructions may correspond to a control logic for training a machine learning model.

In some embodiments, by executing the executable instruction stored in the memory that corresponds to the security scanning for a mini program, the processor is configured to obtain a target mini program to be released; invoke a security scanning strategy combination to perform multi-dimensional security scanning on the target mini program; and when the target mini program passes the multi-dimensional security scanning, release the target mini program to a server for the target mini program to run within a target APP on the server.

In some embodiments, by executing the executable instruction stored in the memory that corresponds to the security scanning for a mini program, the processor is further configured to execute one or more operations including: performing malicious code scanning on the target mini program; performing security loophole scanning on the target mini program; and performing security loophole scanning on a server interface of the target mini program.

In some embodiments, by executing the executable instruction stored in the memory that corresponds to the security scanning for a mini program, the processor is further configured to execute one or more operations including: detecting whether the target mini program includes a payload; detecting whether a malicious invoking function other than authorized invoking functions defined for the target mini program exists in all the functions invoked by the target mini program; and detecting whether media or text content invoked by the target mini program has non-compliant content.

In some embodiments, by executing the executable instruction stored in the memory that corresponds to the security scanning for a mini program, the processor is further configured to execute one or more operations including: detecting whether the target mini program has a sensitive information leaking loophole; detecting whether the target mini program has an HTML code loophole; detecting whether the target mini program has a JS code loophole; and detecting whether the target mini program has an unauthorized external resource reference loophole.

In some embodiments, by executing the executable instruction stored in the memory that corresponds to the security scanning for a mini program, the processor is further configured to parse the server interface of the target mini program; and perform interface loophole scanning on the parsed server interface.

It would be easy for those of ordinary skills in the art to, after considering the present specification and practicing the invention disclosed herein, conceive of other implementation manners of the present specification. The present specification is intended to encompass any variations, uses or adaptive changes of the present specification, and these variations, uses or adaptive changes follow general principles of the present specification and comprise common general knowledge or common technical means in the art that are not disclosed in the present specification. The present specification and embodiments are regarded to be merely exemplary, and the true scope and spirit of the present specification shall be subject to the appended claims.

It should be understood that the present specification is not limited to the accurate structure described above and illustrated in the accompanying drawings, and various modifications and changes may be made to the present specification without departing from the scope thereof. The scope of the present specification shall be only subject to the appended claims.

Particular embodiments of the present specification are described above, and other embodiments fall within the scope of the appended claims. In some cases, actions or steps stated in the claims may be executed in an order different from those in the embodiments and can still achieve desired results. In addition, a process depicted in the accompanying drawings does not necessarily require the illustrated particular order or continuous order to achieve desired results. In some implementation manners, multi-task processing and parallel processing may be feasible or may be beneficial.

The above description are merely preferred embodiments of the present specification, which are not used to limit the present specification. Any modifications, equivalent substitutions and improvements made within the spirit and principle of the present specification shall fall within the protection scope of the present specification.

What is claimed is:

1. A security scanning method for a mini program, comprising:
   obtaining a target mini program to be released;
   invoking a security scanning strategy combination to perform multi-dimensional security scanning on the target mini program, wherein the multi-dimensional security scanning comprises malicious code scanning on the target mini program, security loophole scanning on the target mini program, and security loophole scanning on a server interface of the target mini program;
   wherein the security loophole scanning on the target mini program comprises one or more loophole scanning programs including:
      determining whether the target mini program includes a sensitive information leaking loophole,
      determining whether the target mini program includes an HTML code loophole,
      determining whether the target mini program includes a JS code loophole, and
      determining whether the target mini program includes an unauthorized external resource reference loophole; and
   when the target mini program passes the multi-dimensional security scanning, releasing the target mini program to a server.

2. The method according to claim 1, wherein the malicious code scanning on the target mini program comprises one or more of:
   determining whether the target mini program includes a payload;
   determining whether a malicious invoking function is present in functions invoked by the target mini program, wherein the malicious invoking function is an unauthorized invoking function for the target mini program; and
   determining whether content invoked by the target mini program includes non-compliant content.

3. The method according to claim 2, wherein the determining whether the target mini program includes a payload comprising:
   parsing codes and data in a load of the target mini program; and
   comparing the parsed codes and data with samples of known payloads.

4. The method according to claim 2, wherein the determining whether content invoked by the target mini program includes non-compliant content comprises:
   parsing media and text content invoked by the target mini program; and
   comparing the parsed media and text content with non-compliant content samples.

5. The method according to claim 1, wherein the security loophole scanning on the target mini program comprises:
   performing a comparison with a loophole database by one or more loophole scanners corresponding to the one or more loophole scanning programs.

6. The method according to claim 1, wherein the security loophole scanning on a server interface of the target mini program comprises:
   parsing the server interface of the target mini program; and
   performing interface loophole scanning on the parsed server interface.

7. The security scanning method according to claim 1, further comprising:
   blocking a release flow of the target mini program responsive to the target mini program not passing the multi-dimensional security scanning.

8. A security scanning device for a mini program, comprising one or more processors and a non-transitory computer-readable memory coupled to the one or more processors and configured with instructions executable by the one or more processors to perform operations comprising:

obtaining a target mini program to be released;
invoking a security scanning strategy combination to perform multi-dimensional security scanning on the target mini program, wherein the multi-dimensional security scanning comprises malicious code scanning on the target mini program, security loophole scanning on the target mini program, and security loophole scanning on a server interface of the target mini program;
wherein the security loophole scanning on the target mini program comprises one or more loophole scanning programs including:
determining whether the target mini program includes a sensitive information leaking loophole,
determining whether the target mini program includes an HTML code loophole,
determining whether the target mini program includes a JS code loophole, and
determining whether the target mini program includes an unauthorized external resource reference loophole; and
when the target mini program passes the multi-dimensional security scanning, releasing the target mini program to a server.

9. The device according to claim 8, wherein the malicious code scanning on the target mini program comprises one or more of:
determining whether the target mini program includes a payload;
determining whether a malicious invoking function is present in functions invoked by the target mini program, wherein the malicious invoking function is an unauthorized invoking function for the target mini program; and
determining whether content invoked by the target mini program includes non-compliant content.

10. The device according to claim 9, wherein the determining whether the target mini program includes a payload comprises:
parsing codes and data in a load of the target mini program; and
comparing the parsed codes and data with samples of known payloads.

11. The device according to claim 9, wherein the determining whether content invoked by the target mini program includes non-compliant content comprises:
parsing media and text content invoked by the target mini program; and
comparing the parsed media and text content with non-compliant content samples.

12. The device according to claim 8, wherein the security loophole scanning on the target mini program comprises:
performing comparison with a loophole database by one or more loophole scanners corresponding to the one or more loophole scanning programs.

13. The device according to claim 8, wherein the security loophole scanning on a server interface of the target mini program comprises:
parsing the server interface of the target mini program; and
performing interface loophole scanning on the parsed server interface.

14. The device according to claim 8, wherein the operations further comprise:
blocking a release flow of the target mini program responsive to the target mini program not passing the multi-dimensional security scanning.

15. A non-transitory computer-readable storage medium for security scanning for a mini program, storing instructions executable by one or more processors to cause the one or more processors to perform operations comprising:
obtaining a target mini program to be released;
invoking a security scanning strategy combination to perform multi-dimensional security scanning on the target mini program, wherein the multi-dimensional security scanning comprises malicious code scanning on the target mini program, security loophole scanning on the target mini program, and security loophole scanning on a server interface of the target mini program;
wherein the security loophole scanning on the target mini program comprises one or more of:
determining whether the target mini program includes a sensitive information leaking loophole;
determining whether the target mini program includes an HTML code loophole;
determining whether the target mini program includes a JS code loophole; and
determining whether the target mini program includes an unauthorized external resource reference loophole; and
when the target mini program passes the multi-dimensional security scanning, releasing the target mini program to a server.

16. The non-transitory computer-readable storage medium according to claim 15, wherein the malicious code scanning on the target mini program comprises one or more of:
determining whether the target mini program includes a payload;
determining whether a malicious invoking function is present in functions invoked by the target mini program, wherein the malicious invoking function is an unauthorized invoking function for the target mini program; and
determining whether content invoked by the target mini program includes non-compliant content.

17. The non-transitory computer-readable storage medium according to claim 16, wherein the determining whether the target mini program includes a payload comprises:
parsing codes and data in a load of the target mini program; and
comparing the parsed codes and data with samples of known payloads.

18. The non-transitory computer-readable storage medium according to claim 16, wherein the determining whether content invoked by the target mini program includes non-compliant content comprises:
parsing media and text content invoked by the target mini program; and
comparing the parsed media and text content with non-compliant content samples.

19. The non-transitory computer-readable storage medium according to claim 15, wherein the security loophole scanning on a server interface of the target mini program comprises:
parsing the server interface of the target mini program; and
performing interface loophole scanning on the parsed server interface.

20. The non-transitory computer-readable storage medium according to claim 15, wherein the operations further comprise:

blocking a release flow of the target mini program responsive to the target mini program not passing the multi-dimensional security scanning.

* * * * *